A. P. WILLS.
GEARING.
APPLICATION FILED FEB. 25, 1913.
1,081,643.
Patented Dec. 16, 1913.
2 SHEETS—SHEET 1.
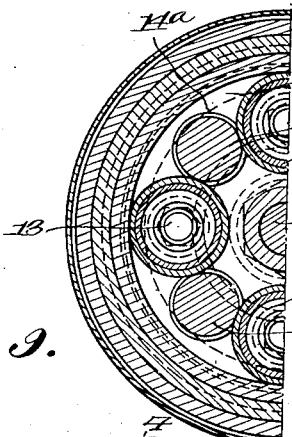
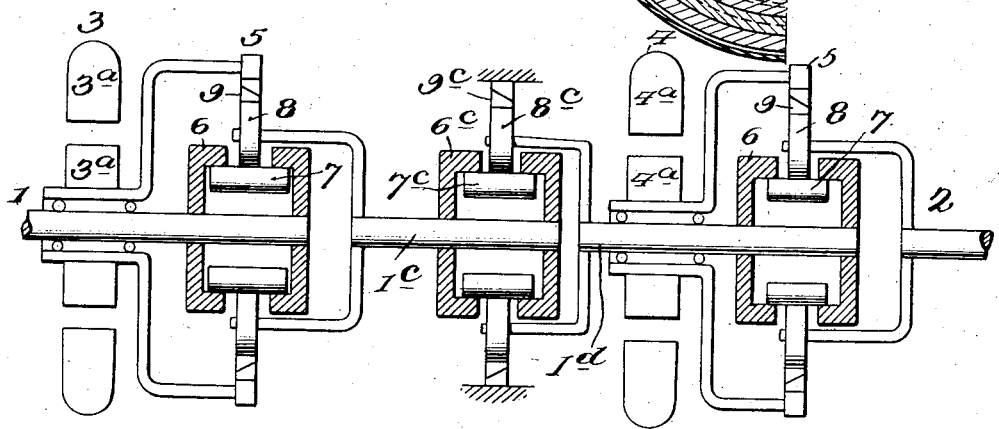
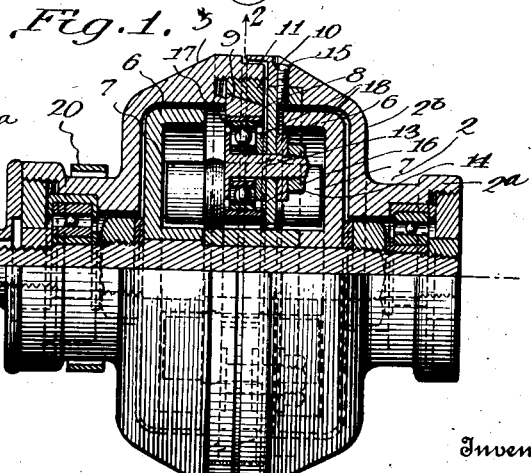
Witnesses
Inventor
Albert P. Wills
By Edmund H. Parry
Attorney

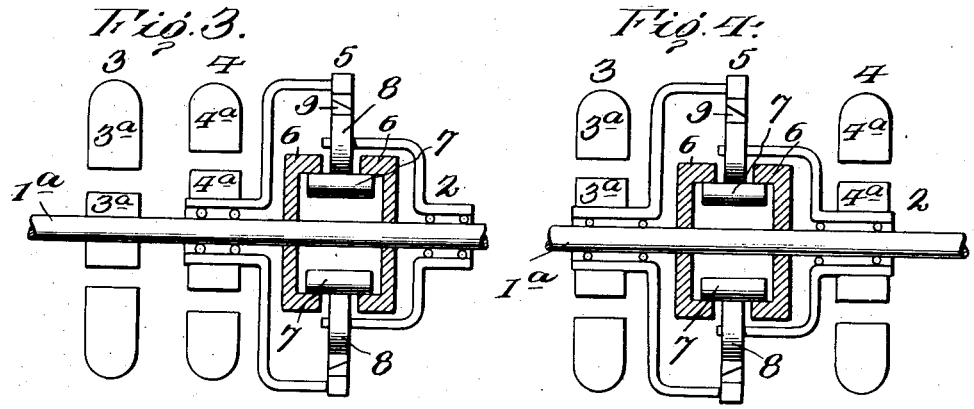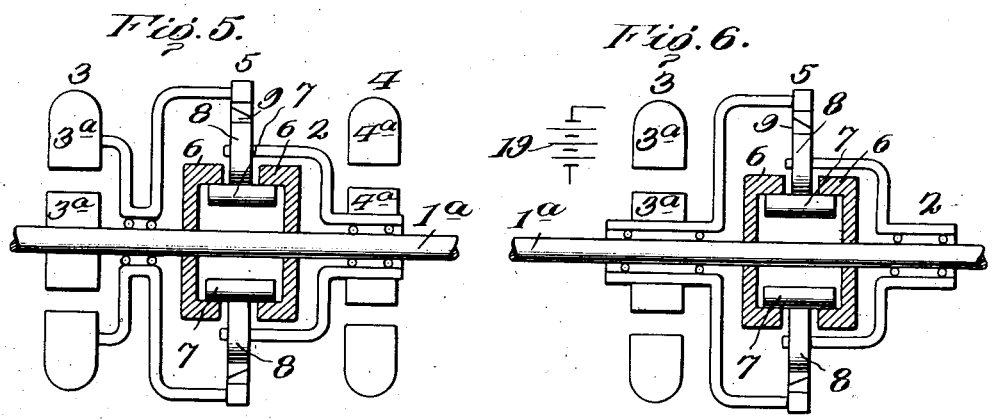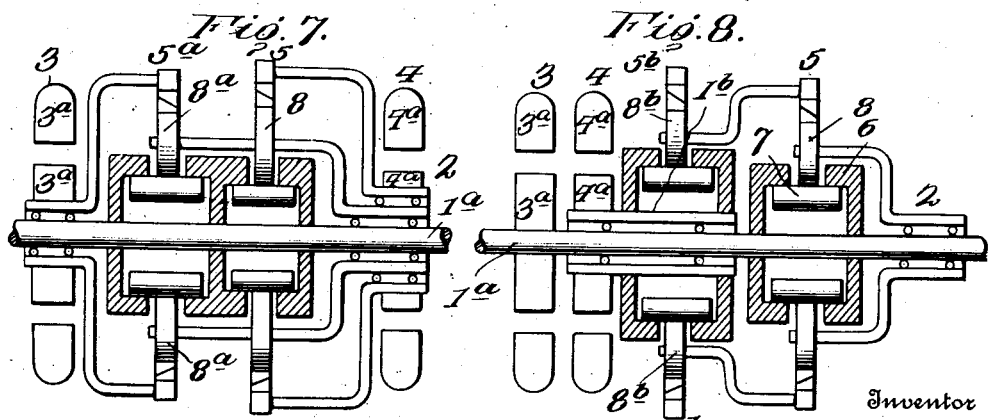

UNITED STATES PATENT OFFICE.

ALBERT P. WILLS, OF NEW YORK, N. Y.

GEARING.

1,081,643.

Specification of Letters Patent. Patented Dec. 16, 1913.

Application filed February 25, 1913. Serial No. 750,669.

*To all whom it may concern:*

Be it known that I, ALBERT P. WILLS, a citizen of the United States, residing at New York, in the county of New York and State of New York, have invented certain new and useful Improvements in Gearing, of which the following is a specification, reference being had therein to the accompanying drawing.

This invention relates to gearing.

The object of the invention is to provide a device whereby power may be transmitted from a prime mover to a load-instrumentality, which is of such nature that it allows of wide variation in the velocity-ratio, angular velocity being exchanged for torque and vice versa, being capable of very simple manipulation at the will of the operator; and such that any speed of the load-instrumentality within certain wide limits may be attained, the passage from one speed to another within those limits occurring gradually through all intermediate speeds.

Other objects of the invention will be apparent from the disclosure hereinafter set forth.

The invention is of such a nature that it is susceptible of various forms of embodiment; and to accomplish the ends hereinabove set forth, I may utilize the principle of the structure, in whole or in part, constituting the subject-matter of an application heretofore filed by me on the 22nd day of January, 1913, Serial No. 743,603, in conjunction with other mechanism as hereinafter set forth.

In the accompanying drawings, I have illustrated some of the many possible embodiments of the invention, the same serving in connection with the description herein to explain the general principles thereof.

In these drawings: Figure 1 is a view in elevation, partly in section, of a machine constructed in accordance with one embodiment of the invention; Fig. 2 is a view in vertical transverse section, on the line 2—2, Fig. 1; and Figs. 3, 4, 5, 6, 7, 8 and 9 are diagrammatic views illustrative of other embodiments.

My invention, generally speaking, includes a plurality of components which, according to one or another of the embodiments, may be variously arranged relatively. These components include, for instance, a primary or drive-instrumentality, 1; a secondary or load-instrumentality, 2; one or a plurality of dynamo-electric machines, 3 and 4; and a governing-instrumentality, 5, with adjunct mechanism constituting a floating structure.

It is to be understood that the term "velocity-ratio" as herein used means the quotient of the angular velocity of the secondary instrumentality by that of the primary instrumentality; and that the "torque-ratio" means the quotient of the torque associated with the primary instrumentality by the torque associated with the secondary instrumentality.

It is to be understood that the drive and load-instrumentalities may be reversed; that is to say, that which, in one instance, is the drive-instrumentality may become the load-instrumentality, or vice versa, according to a particular embodiment. Moreover, the governing-instrumentality and the primary instrumentality may exchange rolls; likewise, the governing-instrumentality and the load-instrumentality. It will be further understood that the dynamo-electric machine 3 includes two elements or components, 3ª, 3ª, in the form of an armature and field. Either of these may be stationary while the other is movable, or both may be movable. The dynamo-electric machine 4 likewise includes two components, 4ª, 4ª, in the form of an armature and field. Either of these may be stationary while the other is movable, or both may be movable.

Referring now to the embodiment illustrated in Figs. 1 and 2, the drive-instrumentality is shown in the form of a shaft 1ª which is adapted to be connected in any convenient way to an appropriate form of power-device. The load-instrumentality, in this embodiment, is shown in the form of a shaft 2ª and includes a housing 2ᵇ. In this instance, the armature is fast on the drive-shaft 1ª and the field is in mechanical connection with the governing-instrumentality 5 and must, therefore, move with it. Furthermore, the armature of the dynamo-electric machine 4 is in mechanical connection with the governing-instrumentality 5 and, thus, movable therewith. The field is, in this instance, stationary.

The governing-instrumentality 5 includes a housing corresponding in general form to the housing 2ᵇ. These two housings form a casing which includes the following instrumentalities: 6, 6 designate two exactly-similar track-rings which are in rigid mechanical connection with the drive-shaft 1 and arranged co-axially with it. Upon these track-rings run, internally, a plurality of equiangularly-spaced rolling-elements which, in this instance, are shown as rolls 7, there being in this instance four of such rolls. The opposite ends of each roll have the same diameter, while the central portion thereof may have a different diameter and be the same for all of the rolls. Contacting with the central portions of these rolls are intermediate rolling-elements which, in this instance, are shown as rolls 8, there being, in this instance, four thereof equiangularly-spaced. These may run on a contractile track-ring 9. Preferably and as shown, the diameters of the two sets of rolls 7 and 8 are such that when the ring 9 is contracted, the pressure exerted by the rolls 8 upon the rolls 7 forces the latter into contact with the rings 6 with considerable normal pressure. This pressure-exerting instrumentality 9 is preferably of the well known split-ring type and tapered on the outside to fit a correspondingly-tapered tightening-nut 10. This nut works in a threaded ring 11 which is recessed to form a shoulder 12 against which is forced—through tightening of the nut 10—the pressure-exerting ring 9, it being understood that such tightening of the nut operates to reduce the diameter of the ring 9.

Extending through each of the intermediate rolls 8 is a driving-pin 13 which projects through a flanged disk 14 and this, by means of the screws 15, is in direct mechanical connection with the load-instrumentality 2. The disk is provided with clearance holes 14$^a$ for the rolls 7. These pins are loose in the intermediate rolls so that, in the process of tightening these rolls, the rolls are capable of movement radially inward. The pins are in the form of stud-bolts and are fastened to the disk by means of nuts 16. Preferably and as shown, ball-bearings 17 are mounted rigidly within the rolls 9. Suitable washers 18 determine the distance of the disk and the rolls.

Operation: In the embodiment shown in Figs. 1 and 2, the mode of operation is as follows: Motion from the prime mover is communicated to the two track-rings 6, 6, through the shaft 1$^a$. Through these rings the rolls 7 are caused to rotate about their own axes, while the set of rolls 7 as a whole is caused to rotate about the shaft 1$^a$. Meanwhile, these rolls communicate a motion of rotation about their own axes to the set of intermediate rolls 8 and the latter rolls travel on the track-ring 9, the set of rolls 8 as a whole being caused to rotate about the shaft 1$^a$ with the same angular velocity as that of the set of rolls 7. This angular velocity depends on the velocity of rotation which is permitted the governing-ring 5 and this is controlled by the torque exerted upon the ring through the action of the dynamo-electric machines 3 and 4. It is thus evident that by varying this torque, in accordance with any of the well-known methods of control of dynamo-electric machines, the angular velocity of rotation of the roll-system as a whole is under the control of the operator. Furthermore, since the load-shaft is caused to rotate at the same angular velocity through the mechanical connection of load-shaft with the rolls by means of the stud-pins 13, the flanged disk 14 and the housing 2$^b$, it is evident that the speed of the load-shaft is under the control of the operator, through his ability to vary the torque exerted by the dynamo-electric machines upon the ring. One of these machines, at a given instant, may be used as a generator, in which case it would feed the other machine running as a motor. Under different conditions, depending upon the velocity-ratio, the functions of the two dynamo-electric machines may be reversed. Except for the energy losses incident to the operation of such machines, the energy taken from the mechanical system by one machine will be restored by the other, unless, as in certain cases is contemplated, part of the energy is utilized in charging a storage battery (not shown). In this case, both dynamo-electric machines might be running as generators supplying energy to the battery. On the other hand, both might be running as motors receiving energy from the battery; or either machine might be running as a generator feeding the other machine and the battery, etc.

It is evident that the electromagnetic method of control in connection with the adjunct storage battery is capable of numerous modifications as regards details of connection and operation in accordance with well known methods.

From this description, it is evident how the velocity ratio is capable of extensive variation at the will of the operator and how speed may be exchanged for torque, and vice versa.

My invention permits of numerous modifications without departing from the spirit and underlying principle thereof and for illustrative purposes merely, I have disclosed herein some of these: In Fig. 3, for instance, one dynamo-electric machine operates with one element mechanically fixed with the drive-shaft 1$^a$, while the other element is stationary; and, in the second dynamo-electric machine, one element is mechanically attached to the governing-ring 5, while the other element is stationary.

In Fig. 4 is shown another modification in which one of the elements of the dynamo-electric machine 4 is mechanically attached to the load-shaft, while the other element is stationary; and one of the elements of the dynamo-electric machine 3 is mechanically attached to the governing-ring 5, while the other element is stationary.

In Fig. 5 is shown still another modification in which one of the elements of the dynamo-electric machine 4 is mechanically attached to the load-shaft 2, while the other is stationary; and one of the elements of the dynamo-electric machine 3 is mechanically attached to the drive-shaft $1^a$, while the other is mechanically attached to the governing-ring 5.

In Fig. 6 is shown still another modification in which one of the dynamo-electric machines is omitted, in lieu of which a storage battery 19 may be employed. One element of the dynamo-electric machine is mechanically attached to the governing-ring 5, while the other element is fixed. In this case, the dynamo-electric machine may run either as a generator or motor, in the first case, supplying energy to the storage battery and, in the second place, receiving energy from it.

Fig. 7 illustrates an embodiment in which a mechanical modification is introduced. Preferably, this consists in the introduction of a second mechanical device similar to that illustrated in Figs. 1 and 2, the intermediate rolls of the second device being marked $8^1$ and the governing-ring $5^a$. Through the mechanical connection shown the angular velocities of the roll-systems in each device about the drive-shaft $1^a$ are made equal. In this case, two dynamo-electric machines 3 and 4 are employed. One element of the machine 4 is mechanically attached to the governing-ring 5, while the other element of this machine is stationary; and one element of the machine 3 is connected to the governing-ring $5^a$, while the other element is stationary.

Fig. 8 shows a further modification in which a second mechanical device, similar to that illustrated in Figs. 1 and 2, is introduced. In this device corresponding to the shaft $1^a$, we have the shaft $1^b$ which consists of a sleeve through which passes the shaft $1^a$. Upon the shaft $1^b$ is mounted one element of the dynamo-electric machine 4, the other element of which is stationary. Through mechanical connection the governing-ring 5 is caused to rotate about the drive-shaft $1^a$ with the same angular velocity as the system of rolls $8^b$. The track-ring $5^b$ is stationary. The dynamo-electric machine 4 either receives energy from the dynamo-electric machine 3 or gives energy to it. One element of the machine 3 is mechanically attached to the drive-shaft $1^a$ while the other element is stationary.

In Fig. 9 is shown a further modification in which there appear three devices coupled in tandem: In this instance, as in the other embodiments described, 1 is the primary instrumentality; 2 is the load-instrumentality; 3 and 4 are the dynamo-electric machines including the elements $3^a$, $3^a$, and $4^a$, $4^a$, respectively; 5 is the governing-instrumentality; 6 are the track-rings on which run the rolls 7; 8 are the intermediate rolls which run on the track-ring 9. As shown, the rolls 8 in the structure at the left drive the shaft $1^c$ to which is attached track-rings $6^c$. On these run the rolls $7^c$ which are in contacting relation with the rolls $8^c$. These in turn run on the track-ring $9^c$. In this case, the track-ring $9^c$ is stationary. The rolls $8^c$ through the mechanical connection shown drive the shaft $1^d$ of the structure at the right, and the rolls 8 of this structure, through the mechanical connection shown are connected to the load-instrumentality 2.

It will be understood that in any or all of the different embodiments already explained I may utilize a storage battery. This will permit both machines running simultaneously as generators or simultaneously as motors; furthermore, it will permit of one dynamo-electric machine running as a generator furnishing energy to the second machine and also to the battery, and vice versa.

It is to be understood that the dynamo-electric machines may be omitted or disconnected, and control of the governing-instrumentality 5 be effected in any other appropriate manner. As an example of a suitable device, I have shown, in Fig. 1, a brake, marked 20, acting on the governing-instrumentality and by which the operator is enabled to control its movement and, thus, of the adjunctive parts.

What I claim is:

1. A structure of the kind described, including a primary instrumentality, a secondary instrumentality, a plurality of power and motion-transmitting elements comprising encompassing elements at least one of which is deformable to act on certain of said motion elements to maintain said elements in operative relationship to effect the transmission of power and energy, and efficient means for subjecting one of said encompassing elements to external control to vary the velocity and torque ratios between the primary and secondary instrumentalities.

2. A structure of the kind described, including a prime mover, a driven part, a plurality of power and motion-transmitting elements comprising encompassing elements at least one of which is deformable to act on certain of said motion elements to maintain said elements in operative relationship to effect the transmission of motion and power, and efficient means for subjecting one of said encompassing elements to external control to vary the velocity and torque ratios between the primary and secondary instrumentalities.

3. A structure of the kind described, including a prime mover, a driven instrumentality, and a device adapted to transmit energy from the prime mover to the driven instrumentality, said device involving at least three components, two of which are capable of movement with respect to each other and of generating and utilizing energy, and a third component including a plurality of power and motion-transmitting elements comprising encompassing elements at least one of which is deformable to act on certain of said motion elements to maintain said elements in operative relationship to effect the transmission of power and energy, and efficient means for subjecting one of said encompassing elements to external control to vary the velocity and torque ratios between the prime mover and the driven instrumentality.

4. A structure of the kind described, including a prime mover, a driven instrumentality, a device for transmitting energy from the prime mover to the driven instrumentality, said device including at least three components, two of which are capable of movement with respect to each other and of generating and utilizing energy, and a third component including a plurality of power and motion-transmitting elements comprising encompassing elements at least one of which is deformable to act on certain of said motion elements to maintain said elements in operative relation to effect the transmission of power and energy, efficient means for subjecting one of said encompassing elements to external control to vary the velocity and torque ratios between the prime mover and the secondary instrumentality, and means for storing energy generated in the structure and for restoring such energy to the structure to effect a variation of the speed and torque ratios.

5. A structure of the kind described, including a prime mover; a driven instrumentality; a device capable of transmitting energy from the prime mover to the driven instrumentality, said device including at least one dynamo-electric machine and at least three other components, two of which are capable of movement with respect to each other and of generating and utilizing energy, and a third component including a plurality of motion and transmitting elements comprising encompassing elements at least one of which is deformable to act on certain of said motion elements to maintain said elements in operative relationship to effect the transmission of power and energy: efficient means for subjecting one of said encompassing elements o external control to vary the velocity and torque ratios between the prime mover and the driven instrumentality; and a storage battery connected to said device.

6. A structure of the kind described including a primary instrumentality; a secondary instrumentality; a governing device interposed between said primary and secondary instrumentalities and including a plurality of power and motion-transmitting elements comprising encompassing elements at least one of which is deformable to act on certain of said motion elements to maintain said elements in operative relationship to effect the transmission of motion and energy; and efficient means for subjecting one of said elements to external control to vary the velocity and torque ratios between the primary and secondary instrumentalities.

7. A structure of the kind described including a primary instrumentality; a secondary instrumentality; a governing device interposed between the primary and secondary instrumentalities and including a plurality of power and motion-transmitting elements comprising rolls and encompassing elements and whose contact motion is one specifically of rolling, at least one of the encompassing elements being deformable to act on said rolls to maintain the rolls and encompassing elements in operative relation to effect the transmission of motion and energy; and efficient means for subjecting said governing device to external control to vary the velocity and torque ratios between the primary and secondary instrumentalities.

8. A structure of the kind described including a prime mover, a driven instrumentality, a device for transmitting an effort from the prime mover to the driven instrumentality, said device comprising at least three components, two of which are capable of movement with respect to the other and of generating and utilizing energy, and a third component operating as a governing element and capable of an angular velocity whose period in relation to the periods associated with the movements of the prime mover and driven instrumentality is such as to involve the velocity ratio thereof, said third component including a plurality of power and motion-transmitting elements comprising encompassing elements at least one of which is deformable to act on certain of said motion elements to maintain said elements in operative relationship to effect the transmission of power and energy, and controlling means for said governing device.

9. A structure of the kind described including a prime mover; a driven instrumentality; a device for transmitting an effort from the prime mover to the driven instrumentality, said device comprising at least three components, two of which are capable of movement with respect to each other and of generating and utilizing energy, and a third component operating as a governing element and capable of an angular velocity whose period in relation to the periods associated with the prime mover and driven instrumentality is such as to involve the velocity ratio thereof; means operating on one of said components involving interchange of energy among the other components to vary the effort applied to the driven part; and a plurality of power and motion-transmitting elements comprising encompassing elements at least one of which is deformable to act on certain of said motion elements to maintain said elements in operative relationship to effect the transmission of motion and energy.

10. A structure of the kind described including a governing device, a plurality of power and motion-transmitting rolls encompassed thereby and whose contact is one specifically of rolling and adapted to rotate about a predetermined axis and comprising encompassing elements at least one of which is operative to act on certain of said rolls to maintain said rolls and elements in operative relationship to effect the transmission of motion and energy; and efficient means for governing the motion of said rolls about said axis.

11. A structure of the kind described including a governing device, a plurality of power and motion-transmitting rolls encompassed thereby and whose contact is one specifically of rolling and adapted to rotate about a predetermined axis and comprising encompassing elements at least one of which is operative to act on certain of said rolls to maintain said rolls and elements in operative relationship to effect the transmission of motion and energy; and means including a torque-producing instrumentality for governing the motion of said rolls about said axis.

12. A structure of the kind described including a rotatable governing instrumentality; a system of elements controlled thereby and whose contact motion is one specifically of rolling and comprising power and motion-transmitting elements and encompassing elements at least one of which encompassing elements is deformable to act on certain of said motion elements to maintain the elements in operative relationship to effect the transmission of motion and energy; and electro-magnetic means for controlling the movement of said governing instrumentality.

13. A structure of the kind described including a governing device; a plurality of power and motion-transmitting elements comprising motion-transmitting rolls and encompassing elements at least one of which is deformable to act on certain of said motion-transmitting rolls to maintain said elements in operative relationship to effect the transmission of motion and energy; and a torque-producing instrumentality effective on said governing device for controlling its movement.

14. A gearing structure including a primary instrumentality; a secondary instrumentality; a plurality of roll-retaining instrumentalities; rolling instrumentalities some of which contact with the primary instrumentality and some with the secondary instrumentality; means for producing motion specifically of rolling at all surfaces touched by each of the rolling instrumentalities; a rotatable governing instrumentality encompassing said rolling and roll-retaining instrumentalities; and efficient means for subjecting said governing instrumentality to external control to vary the velocity and torque ratios between the primary and secondary instrumentalities.

15. A structure of the kind described including a primary instrumentality, a secondary instrumentality, a plurality of power and motion-transmitting elements comprising motion-transmitting rolls supported independent of journals, and encompassing elements at least one of which is deformable to act on certain of said rolls to maintain the elements in operative relationship to effect the transmission of motion and energy, and efficient means for subjecting an encompassing element to external control to vary the velocity and torque ratios between the primary and secondary instrumentalities.

16. A structure of the kind described including a prime mover; a driven instrumentality; a device capable of transmitting energy from the prime mover to the driven instrumentality and including a plurality of dynamo-electric machines, one at least of which includes two components of which one is capable of movement with respect to the other and of generating and utilizing energy; a governing instrumentality connected to one of said dynamo-electric machines; and a plurality of power and motion-transmitting elements acting under the control of said governing instrumentality and comprising a plurality of motion-transmitting rolls and a plurality of encompassing elements at least one of which is actuatable to act on certain of said motion-transmitting rolls to maintain said elements in operative relationship to effect the transmission of motion and energy.

17. A structure of the kind described including a primary instrumentality; a secondary instrumentality; a governing device interposed between said instrumentality and including two dynamo-electric machines, each including two components capable of movement with respect to each other and generating and utilizing energy and adapted to operate upon said governing device to control the angular velocity thereof, the period of said governing instrumentality in relation to the periods associated with the movements of the prime mover and driven instrumentality being such as to involve the velocity ratios thereof; a plurality of power and motion-transmitting elements including two series of rollers and a plurality of encompassing elements therefor, at least one of which is deformable to act on certain of said rollers to maintain the elements in operative relationship to effect the transmission of motion and energy, and a driven instrumentality operatively connected with certain of said rollers and whose angular velocity is controlled thereby.

In testimony whereof I affix my signature in presence of two witnesses.

ALBERT P. WILLS.

Witnesses:
EMMONS H. PARRY,
A. M. PARKINS.